Nov. 18, 1958  W. TAYLOR ET AL  2,860,653
APPARATUS FOR CONTROLLING THE EMPTYING OF TANKS
Filed Jan. 24, 1955  3 Sheets-Sheet 1

INVENTORS
WILLIAM TAYLOR
EVERETT H. BADGER JR.
BY SAMUEL D. BURTON
ATTORNEYS

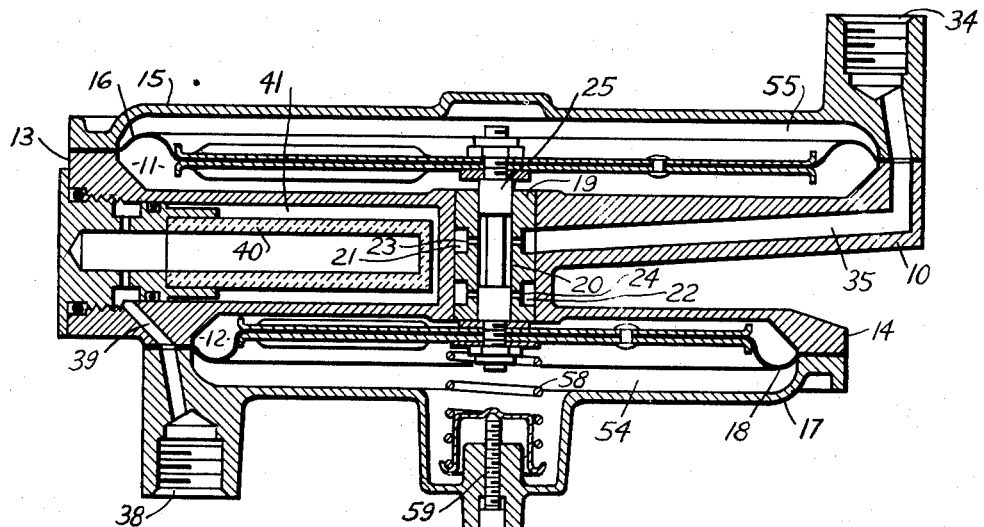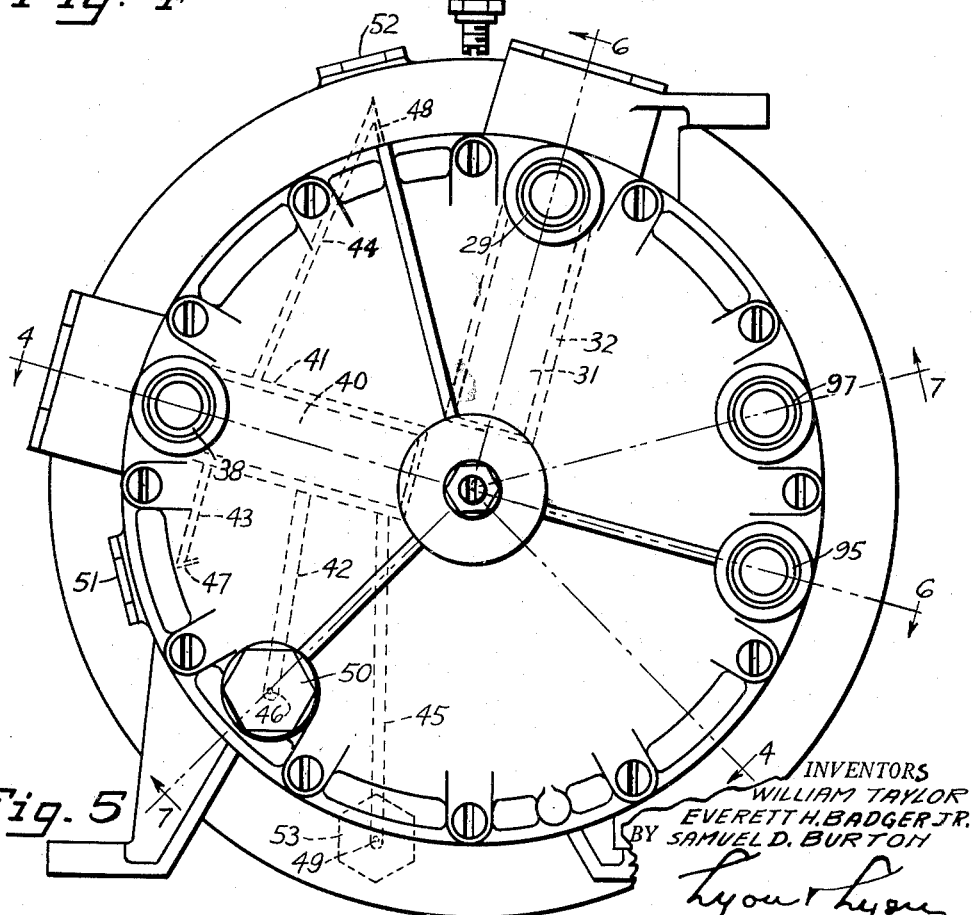

:::
United States Patent Office 2,860,653
Patented Nov. 18, 1958

2,860,653
APPARATUS FOR CONTROLLING THE EMPTYING OF TANKS

William Taylor, Pomona, and Everett H. Badger, Jr., and Samuel D. Burton, Los Angeles, Calif., assignors to The Parker Appliance Company, Cleveland, Ohio, a corporation of Ohio Application January 24, 1955, Serial No. 483,662

12 Claims. (Cl. 137—98)

This invention relates to an apparatus for controlling the emptying of liquid from tanks and more particularly to an apparatus for controlling the relative rate at which a pair of tanks empty so that a predetermined head relationship of the liquid within the two tanks will be maintained.

The invention has particular use in aircraft where it is essential that fuel tanks empty at a predetermined relative rate for properly controlling distribution of weight of fuel relative to the center of gravity of the airplane as the fuel is being consumed.

The invention is an improvement over the apparatus disclosed in the co-pending patent application Serial Number 483,646 of Robert H. Davies and Serial Number 483,647 of Everett H. Badger, Jr. both filed January 24, 1955. These applications disclose apparatus for maintaining predetermined relationships in the heads of liquid within a pair of tanks wherein pressure sensing lines are connected from each tank to a control member having pressure receiving areas. The control member is responsive to variations in the pressure sensing lines to operate a fluid pressure valve which regulates the discharge of fuel from one of the tanks.

In these copending applications the pressure sensing lines contain liquid. One of the improvement features of the present invention is a provision for purging liquid from the sensing lines and maintaining the latter full of air while the apparatus is in operation. When the sensing lines are liquid-filled the head pressures of the liquid within the sensing lines must be taken into account in addition to the head pressures within the tanks. This requires that the amount of liquid in the sensing lines be controlled and that the lines be located in a particular manner to avoid relative changes in the head pressures transmitted to the control member under changes in attitude of the aircraft.

In addition to utilizing air filled sensing lines, another object of the present invention is to provide an apparatus of the type described in which there is a continuous bleed of air through the sensing lines while the apparatus is in operation for purging the lines of any liquid which may gain entrance thereto due to splashing or surging of the liquid due to inertia or gravity forces while the aircraft is in motion.

It is another object to provide a continuous air bleed through the sensing lines at a restricted rate so that the air from the sensing lines may be discharged into pneumatically pressurized fuel tanks as the latter are emptying so that the quantity of air entering the tanks through the sensing lines will not be sufficient to cause a rise in pressure of the air within the tanks.

It is another object to provide an apparatus of the type described in which the remaining liquid head in one of a pair of tanks is maintained at a substantially fixed ratio with respect to the liquid head in another tank as both tanks are emptying.

Other objects of the invention will become apparent from a detailed description and from the drawings in which:

Figure 4 is a cross section view of the control member which is responsive to sensed pressures in the tanks, the view being taken along lines 4—4 of Figure 5.

Figure 5 is a bottom view of the control member.

Figure 1:
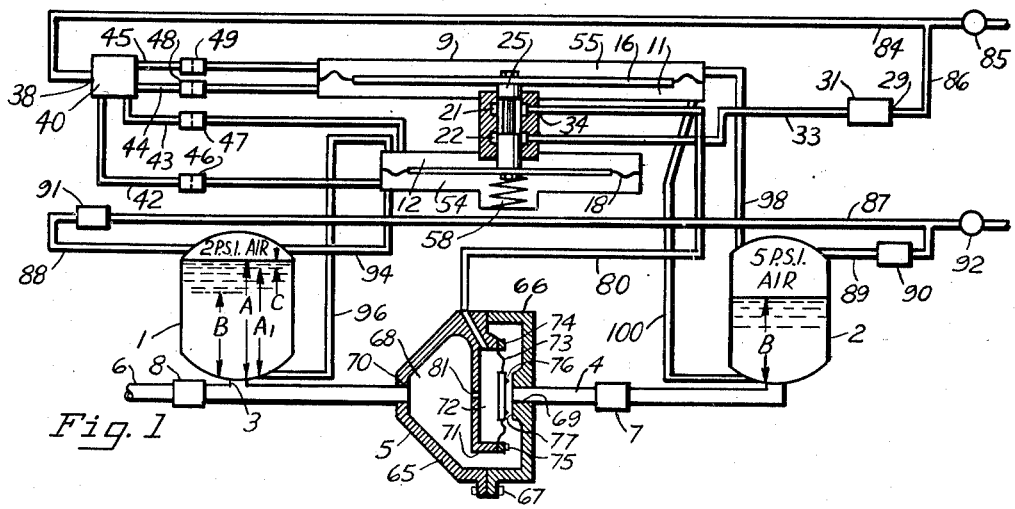
Figure 1 is a schematic cross section view of the apparatus with the parts in the position they assume when the two tanks are emptying at a predetermined relative rate.

In a preferred embodiment of the invention, a pair of aircraft fuel tanks 1 and 2 are provided with discharge conduits 3 and 4, respectively. Conduit 4 leads from the bottom of tank 2 to a modulating valve 5 and then to a main delivery conduit 6. The discharge conduit 3 connects the bottom of tank 1 to the main conduit 6 and the latter leads to the aircraft engines, not shown. There is a shut off valve 7 in conduit 4 between tank 2 and the modulating valve 5 and there is a similar shutoff valve 8 in the main delivery conduit 6 between the tank 1 and the engines.

Also connected to the tanks is a differential pressure control device 9. This device is illustrated in detail in Figures 4, 5, 6, and 7. The following description is directed to these figures but the same numerals are used to identify the important elements of the device in the schematic views of Figures 1, 2, and 3.

The differential pressure control device comprises a central casing section 10 having opposed recesses 11 and 12 surrounded by annular rims 13 and 14 respectively. Clamped to the rim 13 by a cap 15 is a flexible diaphragm assembly 16, and clamped to the rim 14 by a cap 17 is another flexible diaphragm assembly 18.

Mounted by means of a press fit in the central portion of the casing member 10 is a bushing 19. This bushing has a bore 20 in which a piston valve 25 is slidably mounted. The bushing 19 has a pair of grooves 21 and 22 connected to the bore 20 by radial holes 23 and 24, respectively.

The valve member 25 is connected at one end to diaphragm assembly 16 and at the other end to diaphragm assembly 18. An inlet port 29 is connected by a passage 30 to the interior of a filter 31 which is mounted in chamber 32. Chamber 32 is connected to undercut 22 by means of a passage 33. Undercut 21 is connected to an outlet port 34 by means of a passage 35.

Another inlet port 38 is connected by a passage 39 to the interior of a filter 40 mounted in a chamber 41. Leading from the filter chamber 41 are passages 42, 43, 44, and 45 which communicate respectively with restricted orifices 46, 47, 48, and 49 formed in plugs 50, 51, 52, and 53. Orifice 46 communicates with pressure chamber 54 formed between cap 17 and diaphragm 18. Orifice 47 communicates with recess 12, which constitutes a pressure chamber. Orifice 48 communicates with recess 11, which also constitutes a pressure chamber, and orifice 49 communicates with pressure chamber 55 formed between diaphragm 16 and cap 15.

A spring 58 is interposed between the diaphragm 18 and an adjusting screw 59.

Referring now more particularly to the schematic arrangement of Figure 1, the modulating valve 5 includes a valve casing 65 and a cap 66 fastened together by screws 67 and forming a valve chamber 68 therebetween. The cap 66 has an inlet port 69 connected to the conduit 4 and the casing 65 has an outlet port 70 connected to the conduit 6. A cup shaped wall member 71 extends into the chamber 68 and forms a pressure chamber 72 which is closed by a diaphragm 73 attached to the cup shaped member 71 by a ring 74 and suitable screws 75. Diaphragm 73 carries a valve member 76 which is adapted to open and close against a valve seat 77 surrounding the inlet port 69.

Pressure chamber 72 is connected to the outlet port 34 of the differential pressure control device 9 by a pipe line 80 and is alos connected to valve chamber 68 by an orifice 81 in the wall member 71.

The inlet port 38 of the differential pressure control device leads to the filter element 40 and is connected to a pipe line 84 which in turn is connected to a source of air pressure, this source not being shown. Preferably, air is supplied to the line 84 at relatively low pressure, for example 10 p. s. i. A conventional shutoff valve 85 of any suitable type is provided in line 84 for turning the air supply on or off. A branch line 86 connects the air supply line 84 to the inlet port 29 in the differential pressure control device. A passage 30 connects with groove 21 through filter 31 and passage 33.

Another pipe 87 leads from the source of air under pressure and has a branch conduit 88 leading to the top of tank 1 and another branch conduit 89 leading to the top of tank 2. A pressure regulator 90 of any well known type maintains the air in tank 2 at any desired pressure, preferably on the order of 5 p. s. i., for forcing the fuel from the tank. Similarly, another pressure regulator 91 maintains the air in tank 1 at a selected pressure, preferably about 2 p. s. i. A valve 92 of any well known type is utilized for turning the supply of air to pipe 87 on or off.

The top of tank 1 is connected by means of a pipe 94 to inlet port 95 of the differential pressure control device which in turn leads to pressure chamber 54. A pipe 96 connects the bottom of tank 1 to inlet port 97 which in turn leads to pressure chamber 12. Similarly, the pipe 98 leads from the top of tank 2 to the inlet port 99 which connects with the pressure chamber 55. Pipe 100 connects the bottom of tank 2 to inlet port 101 which leads to pressure chamber 11.

In a typical aircraft fuel system installation, tank 2 may be mounted in the fuselage forward of the airplane's center of gravity. Tank 1 may be mounted aft of the center of gravity and may be either higher or lower or at the same height as tank 2 when the airplane is in its normal level flight attitude. In the accompanying drawings the tanks are shown at the same height.

When it is desired that the liquid head in tanks 1 and 2 be substantially the same initially and remain the same as the tanks are emptying, the spring 58 is omitted or a very light spring is provided. In addition the diaphragms 16 and 18 are made of the same diameter.

If the head of liquid in tank 1 is to be initially greater than the liquid head in tank 2 by a predetermined amount, and this head difference is to be maintained as the tanks empty, spring 58 is provided and the diaphragms 16 and 18 are again made the same diameter.

If the head in tank 2 is to be greater than the head in tank 1 by a predetermined amount and this difference is to be maintained as the tanks empty, the spring 58 is again provided, the diaphragms are made to the same size, but the connections from the differential pressure control unit 9 to the two tanks are reversed. In other words tank 2 is connected to the pressure chambers 54 and 12 and tank 1 is connected to pressure chamber 11 and 55.

When it is desired that one of the tanks empty at a predetermined fixed ratio with respect to the other tank, the diaphragm associated with the tank to have the smaller liquid head is made with an effective area proportionally larger than the effective area of the diaphragm associated with the other tank. If there is to be an initial head difference before the tanks start emptying at the predetermined ratio the spring 58 is additionally provided. Thus, if the head in tank 2 is to be a fixed percentage of the head in tank 1 less a predetermined constant difference, the spring 58 is used to provide the predetermined constant difference and diaphragm 18 is proportioned so that its effective area will be the same percentage of the effective area of diaphragm 16 as the desired percentage difference in the tank heads after discounting the predetermined fixed difference. This is the arrangement particularly illustrated in the figures.

Thus, referring to Figure 1, if it is desired to have a predetermined difference C in the two tank heads, which difference remains constant as the tanks empty, a spring 58 is provided which will transmit as much force to the diaphragm 18 as would a liquid head of magnitude C operating on the effective area of diaphragm 18.

In addition, if the actual head B of tank 2 is to be a fixed percentage, say 75%, of head A1 of tank 1 (A1 being actual head A less the constant difference C), diaphragm 18 is made with an effective area 75% that of diaphragm 16.

To operate the system, valves 85 and 92 are opened to admit air under pressure to lines 84 and 87. Air from supply line 87 enters tank 2 through line 89 and is maintained at 5 p. s. i. by regulator 90. At the same time, air from line 87 enters tank 1 through line 88 and is maintained at 2 p. s. i. by regulator 91. Valves 7 and 8 are then opened. The 2 p. s. i. air pressure in tank 1 forces the fuel from the tank into conduit 3 and then to conduit 6 from which it is delivered to the engines. Meanwhile, the air pressure in tank 2 forces fuel into conduit 4, through valve 5, and into conduit 6 from where it also is delivered to the engines. The air pressure in tank 2 is maintained at a higher value than in tank 1 to preclude back flow of fuel from tank 1 into tank 2.

As the fuel is being delivered to the engines, air under pressure from supply line 84 passes through the filter 40 into the branch passages, 42, 43, 44, and 45. From these passages it passes through restricted orifices 46, 47, 48, and 49 into pressure chambers 54, 12, 11, and 55, respectively. The orifices greatly restrict the flow of air into these pressure chambers so that the pressure in the latter will be but slightly higher than the pressures in the lines 98, 100, 96, and 94, which freely connect the chambers to the tanks. The slight amount by which the pressures in the chambers exceed the pressures in lines 98, 100, 96, and 94 at the vicinity of the connection of the latter to the tanks is equal to the pressure drop in the lines as the air slowly passes therethrough to the tanks.

Assuming that the pressure drop in each of the lines 98, 100, 96, and 94 is equal to .1 p. s. i., it is apparent that the pressure in chamber 55 will be equal to 5.1 p. s. i. and that the pressure in chamber 11 will be equal to 5.1 p. s. i. plus the pressure of head B, which for purposes of illustration may be assumed to be .9 p. s. i. at a given stage when the tanks are emptying. Thus, at that time the total air pressure in chamber 11 is 6 p. s. i.

At the same time, the air pressure in chamber 54 is 2.1 p. s. i. and in chamber 12 is 2.1 p. s. i. plus that due to liquid head A. Assume that liquid head B is to be 75% of head A after deducting a predetermined constant difference C and that the latter is to be of a magnitude equivalent to a head pressure of .1 p. s. i. The pressure of head A then becomes 1.3 p. s. i. This added to 2.1 p. s. i. air pressure totals 3.4 p. s. i. air pressure in chamber 12.

In chamber 54 there is 2.1 p. s. i. air pressure plus the action of the spring 58. Since the spring provides the head difference C, it acts on diaphragm 18 with a force the equivalent of a 2.2 p. s. i. force acting upward on diaphragm 18.

The difference of 5.1 and 6 p. s. i. acting on opposite sides of diaphragm 16 yields a net overbalance of .9 p. s. i. acting on diaphragm 16 acting in the upward direction. Assuming that diaphragm 16 has an effective area of ten square inches, this yields a total upward force of 9 pounds. Meanwhile, the 3.4 p. s. i. and the force equivalent to 2.2 p. s. i. acting on opposite sides of diaphragm 18 result in an unbalanced force of 1.2 p. s. i. acting downwardly on diaphragm 18. To maintain an equilibrium position for the two diaphragms and the valve 25, the area of diaphragm 18 must be such that when it is multiplied by 1.2 p. s. i. a like force of 9 pounds is obtained. This effective area thus becomes 7.5 square inches, which is 75% of the area of diaphragm 16.

In this position of equilibrium, as illustrated in Figure 1, the valve 25 is so positioned that it just slightly uncovers undercut 22 to allow a small amount of air to flow from inlet passage 33 through the outlet port 34, line 80, and into pressure chamber 72 of the modulating valve 5. From pressure chamber 72 the air escapes through the restricted opening 81 but the inflow and outflow from chamber 72 is such that the correct pressure is maintained in chamber 72 for positioning valve 76 to permit the proper flow of fuel from tank 2 through modulating valve 5 into delivery conduit 6.

Figure 2:
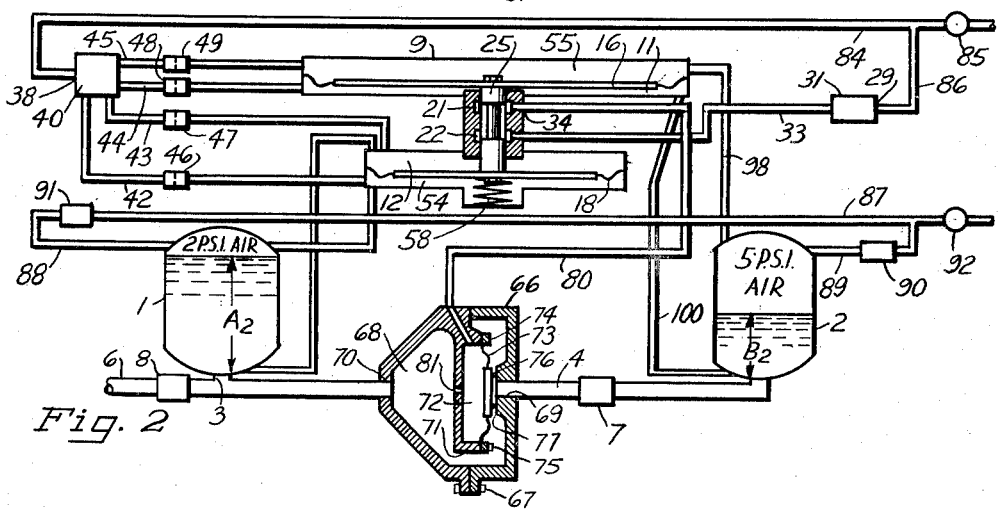
Figure 2 is a view similar to Figure 1 but showing the parts in the position assumed when the ratio of the heads of the liquid within the two tanks is greater than the predetermined amount.

In the event more fuel has emptied from tank 2 than from tank 1 than provided for in accordance with the predetermined relationship, the pressure due to head B2 will be correspondingly less and the pressure within chamber 11 will be lower than that required to keep the diaphragm 16 in the equilibrium position. As a result, the pressure in chamber 11 will not overbalance the pressure in chamber 55 as much as the pressure in chamber 12 overbalances that in chamber 54, with the net effect that both diaphragms will move downward, as shown in Figure 2, and cause the valve 25 to more fully open groove 22. A greater amount of air from inelt 33 will then pass into the line 80 and pressure chamber 72 of modulating valve 5. This will cause the pressure in chamber 72 to increase and move the valve 76 to a closed position and thus shut off further flow of fuel from tank 2 until such time as the head A2 in tank 1 has decreased the proper amount to be in correct proportion to the head B2. At such time, the parts will resume the position shown in Figure 1.

Figure 3:
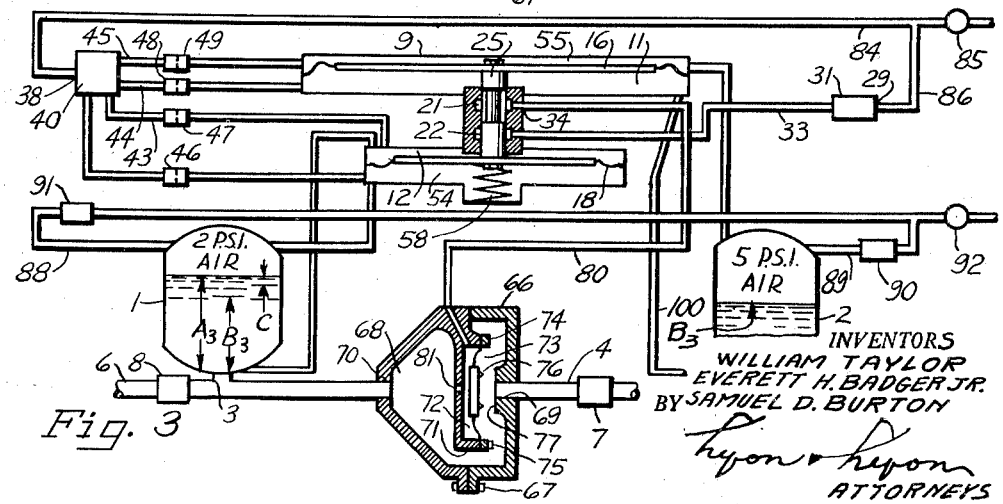
Figure 3 is a view similar to Figure 1 but showing the parts in the position assumed when the ratio of the liquid heads within the two tanks is less than a predetermined amount.
Figure 6:
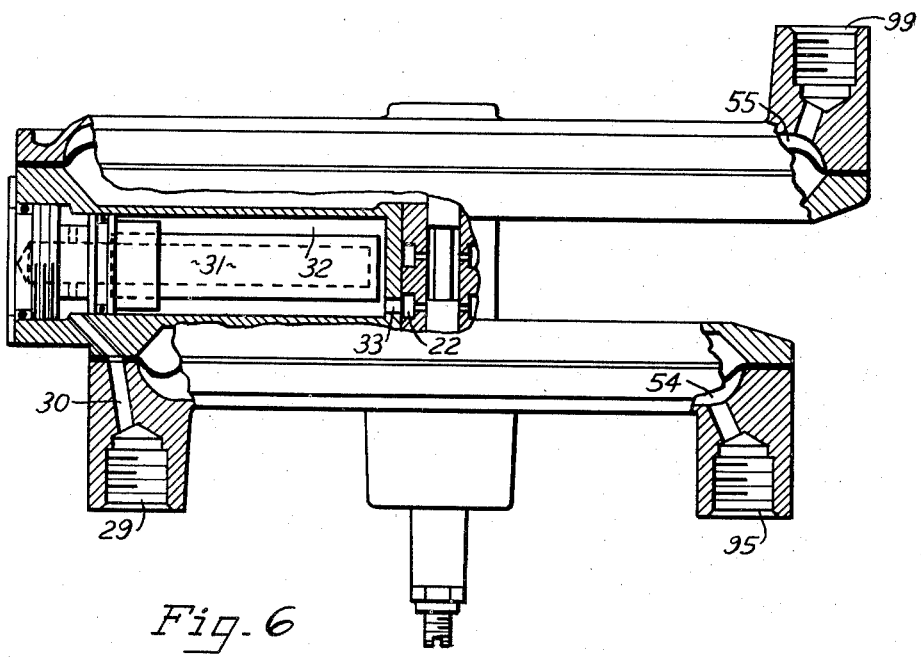
Figure 6 is a partial section view of the control member taken on lines 6—6 of Figure 5.
Figure 7:
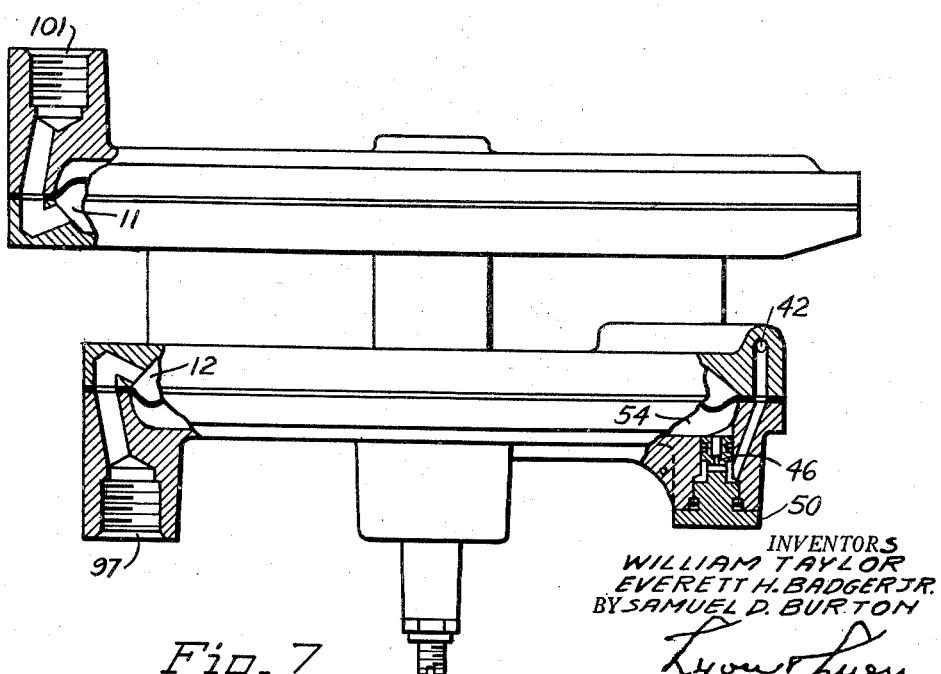
Figure 7 is a partial section view of the control member taken on lines 7—7 of Figure 5.

In the event the fuel level in tank 1 has decreased to a greater extent than the predetermined relationship with the level of fluid in tank 2 the parts will assume the position shown in Figure 3. In this case, the pressure in chamber 12 has decreased below that required to keep the diaphragms in an equilibrium position and hence the diaphragms and the valve 25 will move upward. This causes the valve 25 to close off the undercut 22 and stop the flow of air from inlet port 33 through the outlet 34, line 80 and into pressure chamber 72. Because of the bleed port 81, the pressure in 72 will then decrease and then permit the valve 76 to open more fully and allow fuel to flow from tank 2 faster than the predetermined rate with respect to tank 1. This will continue until the level in tank 2 has decreased sufficiently to restore the predetermined relationship between the heads in the two tanks. At such time the parts will again assume the position shown in Figure 1.

It will be noted that for each tank the sensing lines connecting the top and bottom of the tanks to the respective pressure chambers in the differential pressure control device transmit to the diaphragms the actual fluid pressures existing at the top and bottom of the respective tank. Thus in tank 2 the fluid pressure at the top of the tank is 5 p. s. i. air. The fluid pressure at the bottom of the tank is the head pressure of the liquid plus the 5 p. s. i. exerted upon the liquid by the air in the top of the tank. Thus the 5 p. s. i. due to the air pressure is transmitted through lines 98 and 100 to either side of the diaphragm 16 and their net effect on the diaphragm is zero. The only effective pressure on diaphragm 16 is that due to the liquid head in tank 2.

In like manner the 2 p. s. i. air pressure in tank 1 acts on both sides of diaphragm 18 and cancels out so that the only fluid pressure effective on this diaphragm is that due to the liquid head in the tank and acting in chamber 12.

Since the only effective fluid pressure acting on the diaphragms 16 and 18 is that due to the actual head of liquid in the respective tank the relative height of one tank to the other is immaterial. Thus either tank may be initially installed higher than the other. Likewise, the relative height may vary due to changes in attitude of the aircraft without affecting control of the head relationships by the apparatus.

It is important to exclude liquid from the sensing lines 96 and 100 and to prevent any possibility of liquid fuel travelling one way in these lines while air moves in the other. Air in the lines flows continuously toward the tanks 1 and 2 under the pressure differentials established, and flow of liquid fuel into these lines is prevented by making them relatively small in diameter. The velocity of flow of air is then high enough to prevent countercurrent flow of liquid fuel. In addition the discharge opening of each line into its respective tank may be reduced in size, as compared to the line, further to increase the velocity of air flow.

Although we have shown and described a preferred embodiment of the invention it is apparent that detailed changes may be made in the parts and arrangement without departing from the scope of the invention as defined in the following claims.

We claim:

1. Apparatus for controlling the discharge of liquid from a pair of tanks, comprising, in combination: means for emptying liquid from each tank, means for regulating the rate at which one of the tanks empties, a pair of vertically spaced pressure sensing outlets in each tank, a control means connected to the regulating means, means for transmitting fluid pressures existing at each of said four outlets to said control means, said control means being responsive to said transmitted pressures for controlling the regulating means, and means for excluding liquid from said transmitting means.

2. Apparatus in accordance with claim 1 wherein said means for transmitting fluid pressures comprises conduits containing air subject to the fluid pressures at the respective outlet.

3. Apparatus for controlling the discharge of liquid from a pair of tanks, comprising, in combination: means for emptying the liquid from each tank, means for regulating the rate at which one of the tanks empties, a pair of vertically spaced pressure sensing outlets in each tank, a control means connected to the regulating means, a source of air under pressure, conduits for transmitting fluid pressures existing at each of said four outlets to said control means, said control means being responsive to said transmitted pressures for controlling the regulating means, and means for continuously introducing air from said source into said conduits, the air in said conduits being subject to the fluid pressure at the respective outlet, said outlets being open to said conduits whereby air within the conduits continuously discharges into the respective tank to prevent liquid from entering the conduits.

4. Apparatus in accordance with claim 3 wherein air from said source is introduced into each of said conduits through restricted openings whereby the air pressure on the source side of the restricted openings is higher than the air pressure on the conduit side.

5. Apparatus for controlling the discharge of liquid from a pair of tanks, each having a discharge conduit and each containing air under pressure acting on the liquid therein for forcing the same from the tank into the respective discharge conduit, comprising in combination: means for regulating the rate at which one of the tanks empties through its respective discharge conduit, pressure sensing outlets at the top and bottom of each tank, a control means connected to the regulating means, a source of air under pressure, conduits for transmitting the air pressure at the top of each tank to the control means for acting thereon, conduits connecting the control means to the bottom of each tank, means for continuously introducing air from said source into said bottom connected conduits, the air in said bottom connected conduits being subject to the liquid pressure at the bottom of the respective tank and acting on said control means, said control means being responsive to said transmitted pressures for controlling the regulating means, and said bottom connected conduits being open to the respective tank whereby air within said bottom connected conduits continuously discharges into the respective tank to prevent liquid from entering the bottom connected conduits.

6. Apparatus in accordance with claim 5 wherein the top connected conduits are also connected to said air source and the air pressure at said source is higher than the pressure of air within either tank.

7. Apparatus in accordance with claim 5 wherein the air pressure within one tank is higher than in the other, the top connected conduits are also connected to said air source, and the air pressure at said source is higher than the pressure of air within either tank.

8. Apparatus in accordance with claim 5 wherein air from said source is introduced into each of said bottom connected conduits through a restricted opening whereby the air pressure on the source side of the restricted openings is higher than the air pressure on the conduit side.

9. Apparatus in accordance with claim 5 wherein there is a means for maintaining the air pressure within each tank constant as the tanks are emptying.

10. Apparatus for controlling the discharge of liquid from a pair of tanks, comprising, in combination: means for emptying the liquid from each tank, a fluid pressure operated valve for regulating the rate at which one of the tanks empties, a differential pressure device, means for sensing the liquid head pressure in each tank and for transmitting the same to the differential pressure device, a pressure chamber in said fluid pressure operated valve, a source of fluid under pressure, means including a pilot valve for admitting fluid from said source to said pressure chamber for operating said fluid pressure valve, said differential pressure device being responsive to the liquid head pressures transmitted thereto for controlling said pilot valve, and a restricted opening in said pressure chamber for venting the chamber to reduce the fluid pressure therein when the differential pressure device causes the pilot valve to cut off this supply of fluid under pressure to said chamber.

11. Apparatus in accordance with claim 10 in which the fluid admitted to the pressure chamber for operating the fluid pressure valve is air and the restricted opening in the pressure chamber permits continuous passage of air from the pressure source through the pressure chamber when the pilot valve is open.

12. Apparatus for sensing the liquid level within a tank, comprising, in combination: a first line communicating with the tank at a location above the liquid level, a second line communicating with the tank at a location below the liquid level, means for pressurizing the second line causing a flow of pneumatic fluid continuously therethrough into the tank at a velocity sufficiently great to prevent reverse flow of liquid into said line, a differential pressure device provided with a movable element having opposed first and second areas, and means establishing communication between the first line and the first area and between the second line and the second area.

References Cited in the file of this patent

UNITED STATES PATENTS

| | | |
|---|---|---|
| 1,500,283 | Stinson | July 8, 1924 |
| 1,547,429 | Ludeman | July 28, 1925 |
| 1,901,032 | Kallum | Mar. 14, 1933 |
| 2,509,629 | DeGiers et al. | May 30, 1950 |
| 2,641,274 | Cliffinger | June 9, 1953 |
| 2,726,671 | Zand et al. | Dec. 13, 1955 |
| 2,767,725 | Long | Oct. 23, 1956 |

FOREIGN PATENTS

| | | |
|---|---|---|
| 1,045,485 | France | June 24, 1953 |